(12) United States Patent
Mas

(10) Patent No.: US 6,517,333 B1
(45) Date of Patent: Feb. 11, 2003

(54) MOLD FOR FLAT TREADS OF TIRE CASINGS

(75) Inventor: Robert Mas, Pouilly-En-Auxois (FR)

(73) Assignee: Pneu Laurent SNC, Avallon (FR)

( * ) Notice: Subject to any disclaimer, the term of this patent is extended or adjusted under 35 U.S.C. 154(b) by 0 days.

(21) Appl. No.: 09/584,633

(22) Filed: May 31, 2000

(51) Int. Cl.$^7$ ............................................. B29C 35/02
(52) U.S. Cl. ........................... 425/28.1; 425/46; 425/89
(58) Field of Search ........................... 425/28.1, 89, 46, 425/47, 49, 15, 16, 17, 20, 25, 35, 394; 249/112

(56) References Cited

U.S. PATENT DOCUMENTS

| | | | |
|---|---|---|---|
| 4,772,194 A | 9/1988 | Pizzorno et al. | ............... 425/39 |
| 5,851,557 A | 12/1998 | Pouille et al. | .............. 425/28.1 |
| 6,000,244 A | * 12/1999 | Boaz | ........................... 425/89 |

FOREIGN PATENT DOCUMENTS

| EP | 983 833 | * 3/2000 |
|---|---|---|
| EP | 983834 | * 3/2000 |

OTHER PUBLICATIONS

Patent Abstracts of Japan, Publication No. 08238624 dated Sep. 17, 1996, JP 08 238624 A (Bridgestone Corp), abstract.
Patent Abstracts of Japan, Publication No. 10086163, dated Apr. 7, 1998, JP 10 086163 A (Okura Ind Co. Ltd), abstract.
Patent Abstracts of Japan, Publication No. 04125118, dated Apr. 24, 1992, JP 04 125118A (Isuzu Motors Ltd), abstract.

* cited by examiner

*Primary Examiner*—Jan H. Silbaugh
*Assistant Examiner*—Thu Khan T. Nguyen
(74) *Attorney, Agent, or Firm*—Baker Botts L.L.P.

(57) ABSTRACT

A mold for flat treads of tire casings which includes first and second molding parts respectively defining the outer surface and the inner surface of a tread, at least one of the molding parts being movable between two positions corresponding to opening and closing of the mold and in which one of the molding parts bears at least one elastically deformable element for molding a longitudinal edge of the tread surface and forming and maintaining a tight connection with the two molding parts between a closed position and a slightly-open position of the mold.

7 Claims, 2 Drawing Sheets

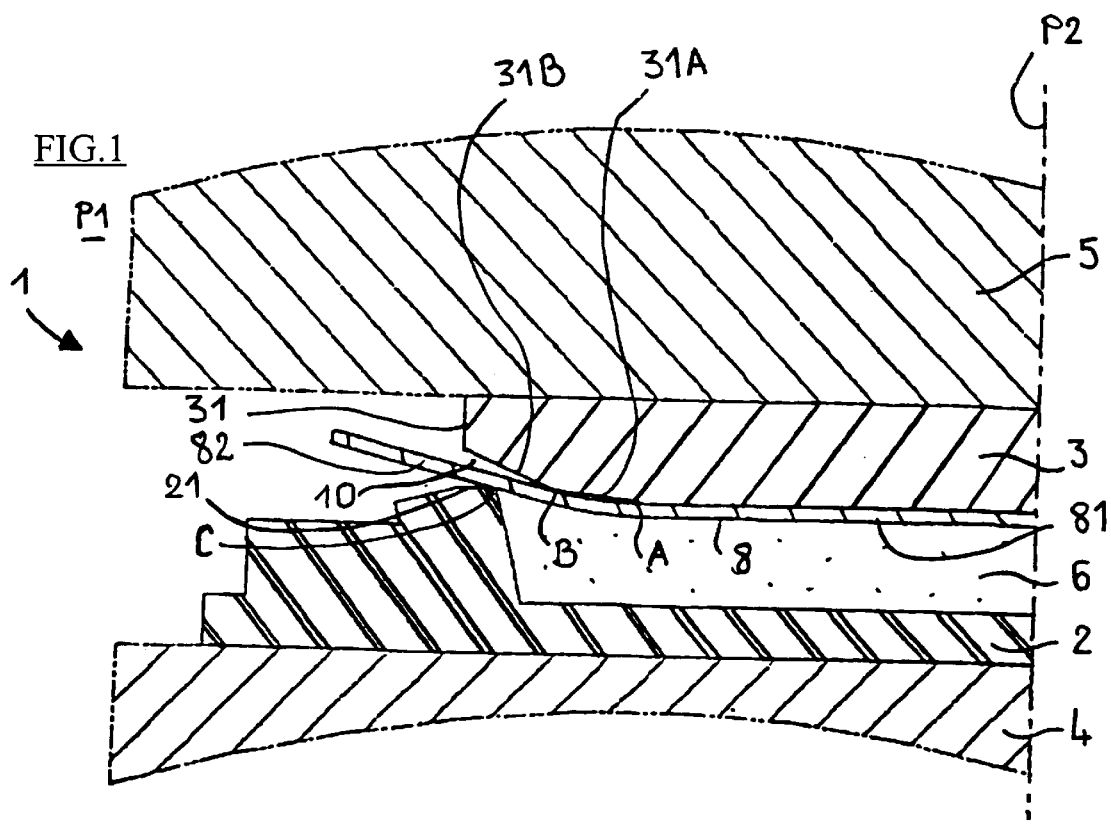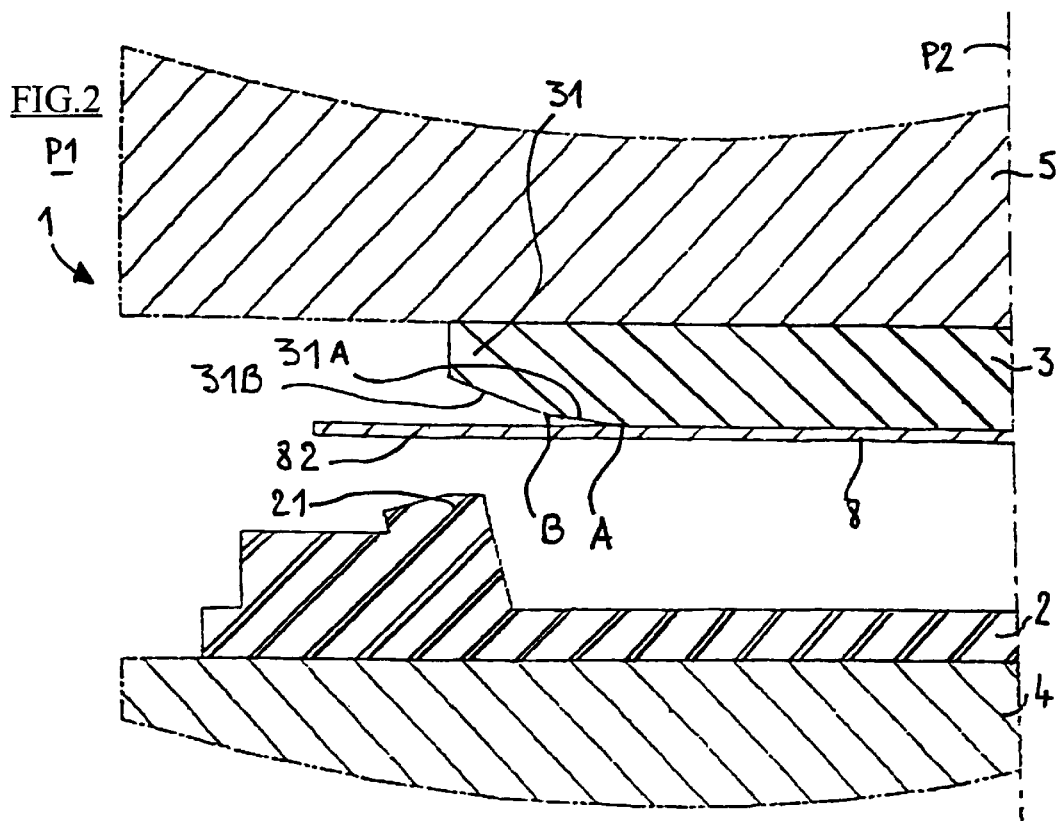

MOLD FOR FLAT TREADS OF TIRE CASINGS

BACKGROUND OF THE INVENTION

The invention concerns a mold for so-called flat treads of tire casings, that is, intended to be molded flat, notably, for the retreading of tire casings.

The invention concerns, in particular, a mold containing first and second molding parts respectively defining the outer surface and inner surface of the tread, at least one of the parts being movable between two positions corresponding to the opening and closing of the mold.

Patent EP-A 0,403,443 describes a tread mold, comprising first and second molding parts respectively defining the outer and inner surfaces of the tread, those molding parts delimiting the tread molding space.

In order to ensure sufficient and uniform pressure on the tread, it is necessary to adjust the molding space to the volume of said tread. But the molding phase generally begins before complete closing of the mold, which entails risks of flow of the rubber out of the tread between the two molding parts. Those zones of rubber "trapped" between the molding parts constitute, at mold outlet, defects commonly known as "flashes," which need to be removed manually.

Patent JP No. 64-77390 presents a flat tread mold making it possible to facilitate the operation of elimination of flashes on the tread. In that mold, cavities receiving a possible overflow of rubber are juxtaposed outside the lateral edges of the molding part defining the outer surface of the tread. The lateral edges further present beveled faces, so that the flashes originating from molding present a marked groove delimiting the desired contour of the tread.

The construction of such a mold therefore simplifies the flash elimination operation, but does not deal with the source of the problem, which consists of preventing the formation of flashes. In fact, even with a facilitated flash elimination operation, flashes constitute a loss of time and material.

Furthermore, in a totally rigid mold the volume expansion of the tread at the time of vulcanization can produce a considerable increase of pressure and appreciable wear on some parts of the mold.

One solution is by control of pressure making it possible, when a predetermined threshold has been reached, to let the two molding parts separate from each other very slightly, for example by a reduction of the external pressure exerted on the movable molding part, and thus to extend the molding space in a direction parallel to a transverse plane of the tread. However, on such expansion, rubber coming out of the tread can flow to the interface of the two molding parts, again causing the appearance of flashes.

The invention is aimed at overcoming all of the foregoing difficulties.

SUMMARY OF THE INVENTION

The position of complete closing of the mold will be described below as "closed position of the mold" and a position of the mold slightly separated from the position of closing of the mold in a direction parallel to a transverse plane of the tread will be described as "slightly-open position of the mold," the expression "slightly separated" corresponding to a mold opening in the order of a few millimeters.

According to the invention, the mold for flat treads of tire casings comprises first and second molding parts respectively defining the outer surface and the inner surface of a tread, at least one of the molding parts being movable between two positions corresponding to opening and closing of the mold, and is such that one of the molding parts bears at least one elastically deformable element securing molding of the longitudinal edges of the tread surface concerned and capable of forming and maintaining a tight connection of the two molding parts between the closed position and a slightly-open position of the mold.

Thus, that mold makes it possible to obtain treads without flashes between the molding parts, whatever the origin of the latter: arising out of molding on closing of the mold or out of vulcanization. Of course, for optimum operation of the mold, it is important to have great precision, such as a tolerance of approximately 1.5% of the volume of rubber entering the mold.

The invention therefore concerns a mold forming a tight connection of the molding parts due to the elastic deformation of a molding element upon closing of the mold, that is, from the start of molding and, therefore, before complete closing of the mold and when a slight separation of one of the molding parts is undertaken at the time of vulcanization.

Other characteristics and advantages of the invention will appear on reading of a description of working example of a mold according to the invention with references to the drawings.

DESCRIPTION OF THE DRAWINGS

FIG. 1 is a partial cross section of the mold in closed position;

FIG. 2 is a partial cross section of the mold represented in FIG. 1 in open position;

DESCRIPTION OF PREFERRED EMBODIMENTS

Figure 3:
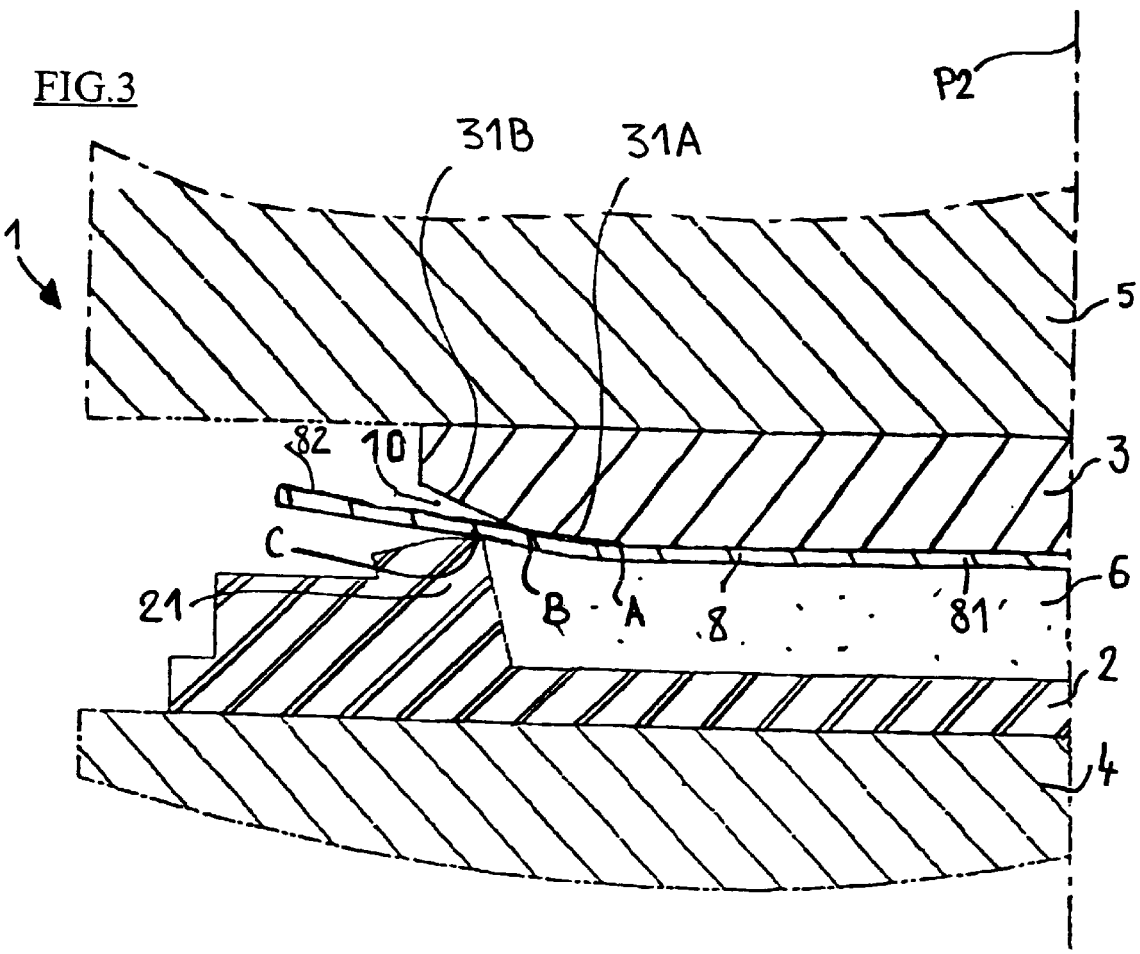
FIG. 3 is a partial cross section of the mold represented in FIG. 1 in slightly-open position.

According to FIG. 2, the mold 1 comprises two molding parts 2 and 3 respectively integrated with a lower press plate 4 and an upper press plate 5. The first lower molding part 2 defines the outer surface of the tread, while the second upper molding part 3 defines the inner surface of the tread.

The shape of the molding space represented in FIG. 1 corresponds to the molding of a tread having longitudinal edges without side "wings." However, these molding shapes are given by way of example and should not constitute a limitation of the invention, which can, in fact, be applied to the molding of flat treads having longitudinal edges with or without side "wings" and regardless of the shape of the latter.

Standard means not represented, such as screw-nut systems, making it possible to integrate each molding part with the corresponding press plate, are regularly distributed along the molding parts, in order to secure a good connection between said molding parts and the plates.

Each molding part can advantageously be made in the form of contiguous sectors respectively coupled to the corresponding plate.

The lower plate 4 is stationary, while the upper plate 5 is movable parallel to a transverse plane P1, that is, vertically in the figures, in order to permit opening and closing of the mold by displacement of the upper molding part 3, as well as to reach intermediate positions. To obtain the movement of the upper plate 5, all appropriate standard means are used, such as mechanical, hydraulic or pneumatic jacks.

It will be clearly apparent on reading of the rest of the specification that a stationary upper molding part as well as a movable lower molding part can be provided without altering the arrangement or operating principle of the invention.

The lower molding part 2 possesses raised edges 21 in contact with the upper molding part 3.

The mold 1 being symmetrical relative to the longitudinal mid-plane, one side P1 of the mold 1 situated on the left of plane P2 will be described, as represented in FIGS. 1 to 3, the other side of the mold then being easily understood by symmetry.

In accordance with FIGS. 1 and 3, for each longitudinal tread molding edge, the mold 1 contains an elastically deformable element 8 borne by the upper molding part 3, capable of forming between the two molding parts 2 and 3 a tight connection in closed position of the mold 1 and of maintaining that tight connection up to the slightly-open position of the mold, either during the mold closing operation or on slight reopening of the mold. That elastically deformable element 8 further ensures molding of the longitudinal edges of the tread surface concerned.

The elastically deformable element arrangement at the longitudinal edges of the mold has the advantage of only very slightly altering the thickness of the longitudinal edges of the tread, in spite of the variation of volume of the cavity 6.

One could also envisage the deformable elements being borne by the lower molding part 2, thus defining the molding of the longitudinal edges of the outer surface of the tread. However, as the outer surface of the tread generally requires great accuracy of sculpture, deformations at the longitudinal edges of the outer surface would risk being transmitted to the center zone of said surface. Consequently, it seems preferable not to alter the molding of the outer surface of the tread by rendering a portion of the lower molding part 2 mobile in the presence of the deformable elements 8.

The elastically deformable element (FIG. 1) is presented in the form of a metal plate 8 mounted at its center zone 81 on molding part 3 and the longitudinal side end 82 of which defines molding of the concerned longitudinal edge of the inner surface of the tread. Several added deformable elements can also be envisaged, which would constitute the longitudinal ends of molding part 3, without the presence of a center zone, though such a construction seems more complex.

The connection between the plate 8 and the upper molding part 3 can be made, for example, by simple screwing.

For that purpose, the upper molding part 3 possesses a profile which makes it possible to define with plate 8 a deflection space 10 for said plate at the longitudinal end of molding part 3. Said profile presents beveled longitudinal side edges 31, each edge 31 possessing two successive bevels 31A and 31B of different inclinations. The longitudinal lines corresponding to the start of the bevels, represented in cross section in FIGS. 1 and 2 by reversal points A and B, are transversely situated, relative to the center of the mold, inside the raised edges 21.

The first bevel 31 A leaves the center zone 81 from point A (seen in cross section) with a slope of approximately 5% and the second bevel 31B extending from point B toward the outside of the mold possesses a steeper slope than bevel 31A, in order to avoid contact between the end 82 of plate 8 and molding part 3.

The presence of these two successive bevels makes it possible to control the curvature of deformation of the end 82 of the plate 8, plate 8 being connected to molding part 3 only up to point A, and to minimize the stress borne by plate 8 on its deformation, particularly for a heavy stress where the end 82 enters into contact with the longitudinal lines respectively covering points A and B, the latters then constituting supports for end 82.

Of course, it is possible to envisage simply a molding part presenting a deflection space for the plate 8 without the presence of that type of guidance and support; however, it is then necessary to choose a material with a mechanical strength and elastic limit much greater in order to form the plate 8.

For example, one can choose to form the plate 8 so that it will be capable of elastically supporting a deflection of 4 mm for a molding pressure of 60 bars, which corresponds to the molding pressures generally used, a steel having an average thickness of 3 mm and having a mechanical strength of approximately 2000 MPa and an elastic strength of approximately 1700 MPa.

In fact, the flow of rubber from the tread generally begins on contact of the latter with the upper molding part which, according to the type of sculpture and the nature of the rubber compound used, can occur 3 to 4 mm before closing of the mold. Depending on these criteria, it is possible to determine the characteristics of the material constituting the elastically deformable plate so that it will be capable of accepting a deflection corresponding to that opening of the mold; said defection generally varies from 1 to 5 mm for a pressure of approximately 60 bars.

The plate 8 can consist, as has just been seen, of a metallic material, but it is also possible to envisage the use of other materials, insofar as the latter make it possible to obtain the elastic deformations and strength desired.

The point of contact, seen in cross section, of the raised edge 21 of the lower molding part 2 with the end 82 of the plate 8 has been designated C.

The operation of the mold 1 between the start of molding of a tread and the end of vulcanization will be briefly described below, with reference to FIGS. 1 and 2, for a single longitudinal edge of the tread. However, it is clear that operation of the mold on the other side of the longitudinal mid-plane P2 is symmetrical and simultaneous with what is to be described.

This description will be given, considering that the volume of rubber used comes within the lower limits of tolerance accepted (−1.5%), operation for other volumes, staying within the limits of tolerance, being easily deduced from that limiting case.

The height of the edges 21 of the lower molding part 2 is so calculated that, for a volume of rubber within the upper limits of tolerance, on the start of molding, the end part 82 of the plate already makes a tight contact with point C, as seen in cross section, the plate 8 then presenting a deflection, as will be seen in more detail in the course of the description.

Before the operation of closing of the mold 1, the plate 8 does not undergo any stress; it is then flat, as shown in FIG. 2.

Due to the mechanical, hydraulic or pneumatic means previously mentioned and being exerted on the upper plate 5, the mold 1 is closed by lowering the upper molding part 3.

Contact between the end 82 of the plate 8 and the edge of the lower molding part 2 is made when the rubber is in contact with the center zone 81 of the plate, but without the latter yet rising in pressure, so that the rubber does not flow to the ends of the mold 1. For that contact to be actually tight, it is necessary for a sufficient stress to be applied on the plate 8 and for the latter to undergo a deformation, even with a very slight deflection. In fact, the plate 8, because of its elasticity, naturally seeks to recover its undeformed initial position and therefore exerts a pressure on the raised edge 21, thus rendering its contact with said edge 21 tight. Furthermore, this deformation curving the end 82 of the plate upward, the forces of gravity also help maintain tightness of the contact between said plate and the edge 21.

The upper molding part 3 therefore continues its descent, exerting then a stress on the plate 8, which is deformed by curvature from the longitudinal line embracing point A and then the one embracing point B. The line of contact, corresponding to point C, between the edge 21 and the end 82 constitutes the zone of tight connection, as can be seen in FIG. 3.

When the rubber starts rising in pressure and molding begins, the rubber cannot then flow between the two molding parts 2 and 3.

The molding part 3 then subjects the plate 8 to an extra stress in order to reach the closed position of the mold represented in FIG. 1 and in which the end 82 of the plate 8 has followed the slope between A and B, seen in cross section, and is in contact with the upper molding part 3 over that whole zone, undergoing a greater deformation than previously, beyond point B toward the outside of the mold 1.

Following closing of the mold 1, the rubber undergoes a temperature rise up to the vulcanization temperature, which can be in the order of 160° C. The volume of rubber in the cavity 6 corresponding roughly to the volume of said cavity, expansion of the rubber entails a progressive increase of internal pressure in the cavity 6.

Beyond a given pressure threshold, a slight backward motion of the upper molding part 3 is allowed upward by any suitable means. The new slightly-open position of the mold 1 corresponds at most to the position of the plate 8 preceding complete closing of the mold 1 making tight contact between the two molding parts 2 and 3, that is, the position in which the plate 8 already had a first deformation. This separation of the molding parts 2 and 3 partly eliminates the extra stress sustained by the plate 8, which returns, owing to its elasticity, to a position that comes slightly closer to its rest position. In this example, the slightly-open position of the mold 1 can correspond to a deflection of approximately 3 mm.

Thus, everything proceeds as if the plate 8 were following the backward movement of the upper molding part 3, continuing to ensure tightness between the two molding parts and creating a vertical expansion of volume of the cavity 6, as shown in FIG. 3, without the rubber being able to flow between the two molding parts 2 and 3.

Thus, the tread obtained presents no flash in the zone of junction of the molding parts 2 and 3. Furthermore, the latter presents a slightly concave outer surface which, contrary to what might be imagined, facilitates its subsequent application on the tire carcass.

I claim:

1. A mold for flat treads of tire casings, comprising first and second molding parts having a longitudinal extent at least coextensive with the longitudinal length of a flat tread to be molded, said parts respectively defining the outer surface and the inner surface of a flat tread, at least one of the molding parts being movable between two positions corresponding to opening and closing of the mold, wherein the direction of movement is transverse to the longitudinal extent of the molding parts, and at least one elastically deformable element mounted on one of the molding parts for molding with the other molding part the longitudinal side edges of the flat tread surface and forming and maintaining a tight connection with the two molding parts between a closed position and a slightly-open position of the mold.

2. A mold according to claim 1, in which the elastically deformable element is mounted on the molding part molding the inner surface of the tread.

3. A mold according to claim 1, in which the elastically deformable element is made of a metallic material.

4. A mold according to claim 1, in which the molding part bearing the elastically deformable element has beveled longitudinal side edges defining deflection spaces for said element.

5. A mold according to claim 4, in which each beveled longitudinal edge includes two successive bevels, one an inner bevel and the other an outer bevel, the outer bevel having a steeper slope than the inner bevel.

6. A mold according to claim 4, wherein the elastically deformable element is a plate which covers at least in part the molding part which bears it.

7. The mold according to claim 4, wherein the elastically deformable element comprises at least one longitudinally extending plate which in part overlies said deflection spaces provided by the beveled longitudinal side edges of the one molding part, the portions of said plate overlying said deflection spaces being elastically deformed into said deflection spaces upon the closing of the mold.

* * * * *